United States Patent
Amargier et al.

(10) Patent No.: US 12,509,235 B2
(45) Date of Patent: Dec. 30, 2025

(54) ELECTRIC PROPULSION ASSEMBLY COMPRISING AT LEAST ONE ELECTRIC MOTOR POSITIONED IN FRONT OF A TRANSMISSION SYSTEM, AIRCRAFT COMPRISING AT LEAST ONE SUCH PROPULSION ASSEMBLY

(71) Applicants: Airbus SAS, Blagnac (FR); Airbus Operations SAS, Toulouse (FR)

(72) Inventors: Rémi Amargier, Toulouse (FR); Frédéric Vinches, Toulouse (FR); Jean-François Allias, Toulouse (FR); Anthony Roux, Toulouse (FR); Norberto Simionato Neto, Taufkirchen (DE); Kotaro Fukasaku, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 253 days.

(21) Appl. No.: 18/350,971

(22) Filed: Jul. 12, 2023

(65) Prior Publication Data
US 2024/0017843 A1    Jan. 18, 2024

(30) Foreign Application Priority Data
Jul. 13, 2022   (FR) ...................................... 2207185

(51) Int. Cl.
*B64D 27/24* (2024.01)
*B64D 35/08* (2006.01)
*H02K 7/116* (2006.01)

(52) U.S. Cl.
CPC ............. *B64D 27/24* (2013.01); *B64D 35/08* (2013.01); *H02K 7/116* (2013.01)

(58) Field of Classification Search
CPC ........ B64D 27/24; B64D 27/30; B64D 35/08; B64D 35/02; B64D 35/021; B64C 11/44;
(Continued)

(56) References Cited

U.S. PATENT DOCUMENTS 9,902,493 B2 *   2/2018  Simon ..................... B64U 30/24
11,565,803 B2 *  1/2023  Heironimus ............. H02K 9/06
(Continued)

FOREIGN PATENT DOCUMENTS

FR            3141675 A1 *  5/2024 ............. B64C 11/06
WO      2020079792 A1     4/2020
WO      2022101094 A1     5/2022

OTHER PUBLICATIONS

French Search Report for corresponding French Patent Application No. 2207185 dated Feb. 6, 2023; priority document.

*Primary Examiner* — Philip J Bonzell
(74) *Attorney, Agent, or Firm* — Greer, Burns & Crain, Ltd.

(57) ABSTRACT

An aircraft propulsion system comprising a propeller, a plurality of electric motors, a transmission system configured to couple the electric motors to the propeller, and a propeller pitch adjustment system positioned at the rear of the transmission system. At least one of the electric motors is positioned in front of the transmission system. A connection structure is interposed between the propeller and the transmission system, the connection structure and the output shaft of the transmission system connected to the propeller being configured so that no electric motor positioned in front of the transmission system interferes with the propeller. Also an aircraft with such a system.

8 Claims, 6 Drawing Sheets

(58) Field of Classification Search
CPC ........ B64U 50/19; B64U 19/20; H02K 7/116;
H02K 5/225; H02K 9/06; H02K 2213/06
See application file for complete search history.

(56) References Cited

U.S. PATENT DOCUMENTS

| | | | | |
|---|---|---|---|---|
| 11,731,779 | B2* | 8/2023 | Speller | B64D 35/08 |
| | | | | 244/7 A |
| 11,746,727 | B2* | 9/2023 | Tasker | B64F 5/00 |
| | | | | 415/122.1 |
| 11,794,913 | B2* | 10/2023 | Lacaux | H03H 1/0007 |
| 12,291,341 | B2* | 5/2025 | Amargier | B64D 27/406 |
| 2008/0006739 | A1* | 1/2008 | Mochida | B64D 27/04 |
| | | | | 267/136 |
| 2013/0231208 | A1 | 9/2013 | Buono et al. | |
| 2018/0029703 | A1* | 2/2018 | Simon | B64U 30/26 |
| 2021/0039796 | A1* | 2/2021 | Hirabayashi | B64D 27/34 |
| 2021/0371120 | A1* | 12/2021 | Speller | F16H 57/08 |
| 2022/0119121 | A1* | 4/2022 | Lacaux | H02K 7/083 |
| 2022/0219817 | A1* | 7/2022 | Knoll | H02K 7/116 |
| 2023/0160357 | A1* | 5/2023 | Tasker | B64D 27/10 |
| | | | | 415/122.1 |
| 2023/0286664 | A1* | 9/2023 | Amargier | B64D 35/021 |
| 2024/0043134 | A1* | 2/2024 | Raucoules | B64D 35/021 |

\* cited by examiner

ELECTRIC PROPULSION ASSEMBLY COMPRISING AT LEAST ONE ELECTRIC MOTOR POSITIONED IN FRONT OF A TRANSMISSION SYSTEM, AIRCRAFT COMPRISING AT LEAST ONE SUCH PROPULSION ASSEMBLY

CROSS-REFERENCES TO RELATED APPLICATIONS

This application claims the benefit of French Patent Application No. 2207185 filed on Jul. 13, 2022, the entire disclosure of which is incorporated herein by way of reference.

FIELD OF THE INVENTION

The present application relates to an electric propulsion assembly comprising at least one electric motor positioned in front of a transmission system, and to an aircraft comprising at least one such propulsion assembly.

BACKGROUND OF THE INVENTION

According to an embodiment shown in FIG. 1, an aircraft 10 comprises a fuselage 12, at least one wing 14 connected to the fuselage 12, and propulsion assemblies 16 connected to the wing 14 and arranged on either side of the fuselage 12. As shown in FIGS. 2 and 3, each propulsion assembly 16 comprises a propeller 18 with an axis of rotation A18.

For the rest of the description, a longitudinal direction X is parallel to the axis of rotation A18 of the propeller 18. A longitudinal plane contains the axis of rotation A18. A transverse plane is perpendicular to the longitudinal direction X. A horizontal transverse direction Y is perpendicular to the longitudinal direction X and oriented horizontally. A vertical transverse direction Z is perpendicular to the longitudinal direction X and oriented vertically. The notions "front" and "rear" refer to the direction of airflow relative to the aircraft in flight, with air flowing from front to rear.

In the case of an electric propulsion assembly, this comprises several electric motors 20, a transmission system 22, such as a gearbox, for example, configured to couple the electric motors 20 to the propeller 18, and a propeller pitch adjustment system 24 having a control shaft 24.1 connected to the propeller 18.

The propulsion assembly 16 comprises an attachment structure 26 connecting the transmission system 22 to a support structure of the aircraft 10, such as the wing structure.

According to the arrangement shown in FIGS. 2 and 3, the transmission system 22 has a first, forward-facing transverse surface 22.1, to which a drive shaft for the propeller 18 is attached, and a second, rearward-facing transverse surface 22.2, to which the electric motors 20 and the propeller pitch adjustment system 24 are attached.

As the control shaft 24.1 of the propeller pitch adjustment system 24 is positioned in the extension of the axis of rotation A18 of the propeller 18, this propeller pitch adjustment system 24 is positioned at the center of the second transverse surface 22.2 and the electric motors 20 are arranged all around the propeller pitch adjustment system 24.

Although this arrangement results in a compact unit, it is not fully satisfactory, as the propeller pitch adjustment system 24 is not easily accessible.

The present invention aims to remedy some or all of the drawbacks of the prior art.

SUMMARY OF THE INVENTION

To this end, the invention relates to an aircraft propulsion assembly comprising a propeller having an axis of rotation, a plurality of electric motors, a transmission system configured to couple the electric motors to the propeller and comprising an output shaft connected to the propeller, and a propeller pitch adjustment system, the transmission system delimiting a front zone in which the propeller is positioned and a rear zone opposite the front zone, the propeller pitch adjustment system being positioned in the rear zone.

According to the invention, at least one of the electric motors is positioned in the front zone. In addition, the propulsion assembly comprises a connection structure interposed between the propeller and the transmission system, the connection structure and the output shaft of the transmission system connected to the propeller being configured so that no electric motor positioned in the front zone interferes with the propeller.

As a result, the propeller pitch adjustment system positioned at the rear of the transmission system is no longer surrounded by electric motors, one of which is located in the front zone. This arrangement improves accessibility to the propeller pitch adjustment system, particularly during maintenance.

According to another feature, the propulsion assembly comprises a guide system interposed between the connection structure and the output shaft of the transmission system connected to the propeller.

According to a further feature, the connection structure comprises a tube extending between first and second ends, the first end being connected to the transmission system.

According to a further feature, the propulsion assembly comprises at least one attachment structure configured to connect the propulsion assembly to a support structure of an aircraft, comprising at least one first attachment point positioned in a first plane as well as at least one second attachment point positioned in a second plane offset in a direction parallel to the axis of rotation with respect to the first plane, the first and second attachment points being positioned on the transmission system and/or the connection structure.

According to another feature, the first and second planes are positioned in line with the connection structure, the first plane being located in line with the first end of the tube, the second plane being located in line with the second end of the tube.

According to a further feature, the attachment structure comprises a frame positioned in a transverse plane, a plurality of oblique connecting rods having a first end connected by a first link to the frame and a second end connected by a second link to one of the second attachment points located at the second end of the tube of the connection structure, and at least two transverse connecting rods each connecting the frame to at least one first attachment point located at the first end of the tube of the connection structure.

According to a further feature, each oblique connecting rod has an orientation. In addition, for each oblique connecting rod, each of the first and second links comprises a joint having a pivot axis positioned in a transverse plane and substantially perpendicular to the orientation of the corresponding oblique connecting rod.

According to another feature, the attachment structure comprises:
two transverse connecting rods positioned on either side of a vertical plane passing through the axis of rotation,
for each transverse connecting rod, at least one first joint connecting the transverse connecting rod and the frame, and at least one second joint connecting the transverse connecting rod and the connection structure,
each of the first and second joints has a pivot axis substantially parallel to the axis of rotation.

According to another feature, the connection structure comprises a plate, positioned at the first end of the tube, which plate has, in a transverse plane, an approximately triangular shape with first, second and third rounded vertices, the tube being positioned close to the first vertex, the second and third vertices being connected by a side opposite the first substantially horizontal vertex, located above the tube and close to the frame, the transverse connecting rods being connected to the plate at the second and third rounded vertices.

The invention also relates to an aircraft comprising at least one propulsion assembly according to one of the preceding features.

BRIEF DESCRIPTION OF THE DRAWINGS

Further features and advantages will become apparent from the following description of the invention, which is given by way of example only, with reference to the appended drawings, in which.

DETAILED DESCRIPTION OF THE PREFERRED EMBODIMENTS

Figure 1:
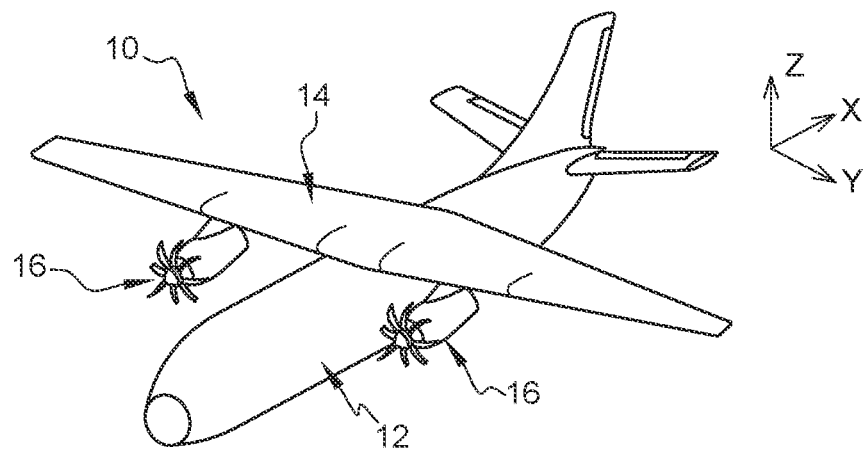
FIG. 1 is a perspective view of an aircraft.
Figure 2:
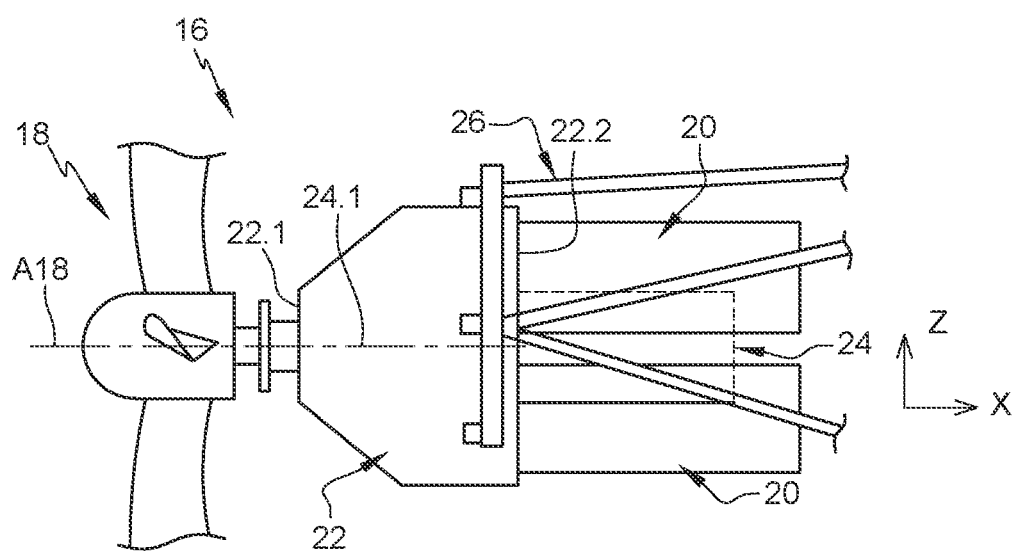
FIG. 2 is a schematic side view of an electric propulsion assembly illustrating an embodiment of the prior art.
Figure 3:
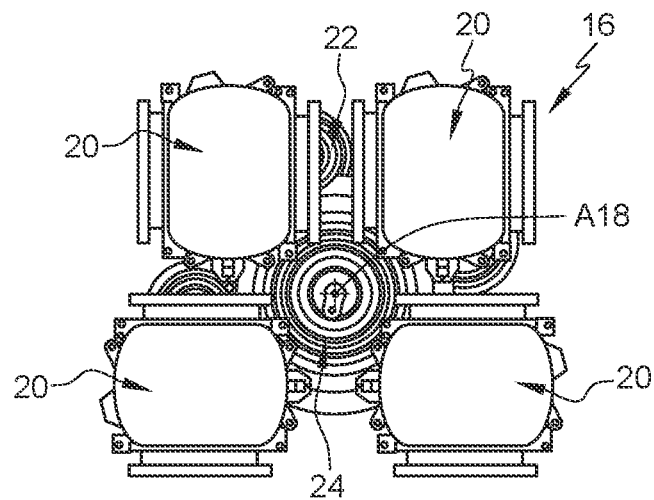
FIG. 3 is a schematic rear view of the electric propulsion system shown in FIG. 2.
Figure 4:
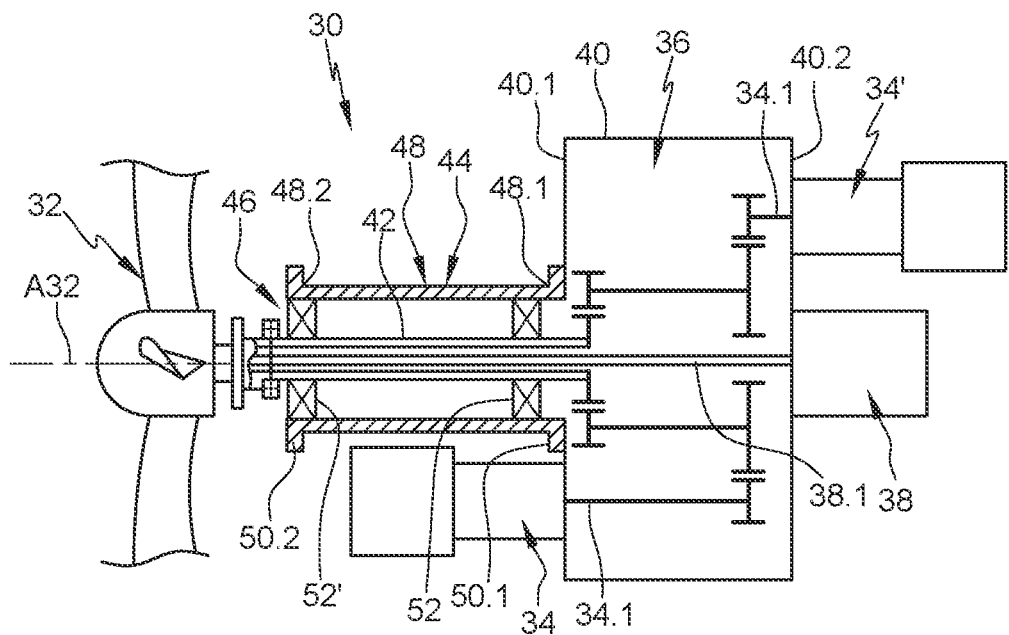
FIG. 4 is a schematic side view of an electric propulsion system illustrating a first embodiment of the invention.
Figure 5:
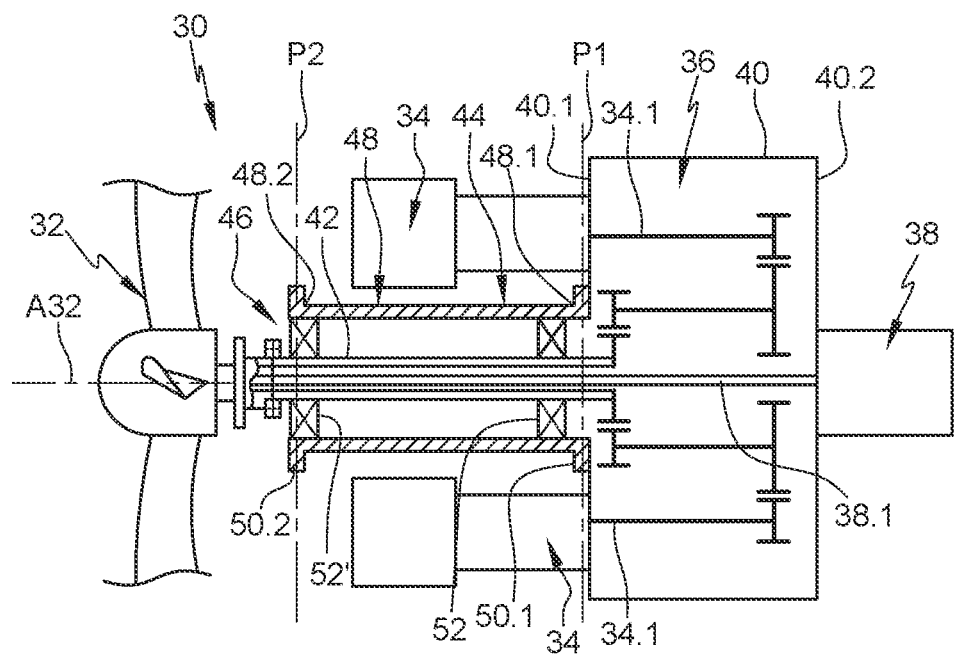
FIG. 5 is a schematic side view of an electric propulsion system illustrating a second embodiment of the invention.

According to the embodiments shown in FIGS. 4 and 5, a propulsion assembly 30 of the electric type comprises a propeller 32 having an axis of rotation A32, a plurality of electric motors 34, a transmission system 36, such as a gearbox, for example, configured to couple the electric motors 34 to the propeller 32, and a propeller pitch adjustment system 38. According to one application, at least one such propulsion assembly 30 is intended to equip an aircraft.

The transmission system 36 delimits a front zone, positioned at the front of the transmission system 36, in which the propeller 32 is positioned, and a rear zone, opposite the front zone, positioned at the rear of the transmission system 36. In one embodiment, the transmission system 36 comprises a housing 40 which has a first transverse surface 40.1, facing the front region, and a second transverse surface 40.2, facing the rear region. The transmission system 36 also comprises a hollow output shaft 42 connected to the propeller 32, projecting from the first transverse surface 40.1.

Each electric motor 34 comprises an output shaft 34.1 connected to the transmission system 36.

The propeller pitch adjustment system 38 is positioned in the rear zone on the second transverse surface 40.2 of the transmission system 36 and comprises a control shaft 38.1 connected to the propeller 32, passing through the transmission system 36 and housed in the output shaft 42 of the transmission system 36.

The propeller pitch adjustment system 38 is connected by any suitable means to the transmission system 36. It is not described further, as it may be identical to those of the prior art.

At least one of the electric motors 34 is positioned between the transmission system 36 and the propeller 32. According to this arrangement, each electric motor 34, positioned in the front zone, is attached to the first transverse surface 40.1 of the transmission system 36. In addition, this first transverse surface 40.1 has a through-hole for the output shaft 42 of the transmission system 36, as well as a through-hole for the output shaft 34.1 of each electric motor 34 positioned in the front zone.

According to an embodiment shown in FIG. 4, at least one electric motor 34 is positioned in the front zone and at least one electric motor 34' is positioned in the rear zone.

According to an embodiment shown in FIG. 5, all the electric motors 34 are positioned in the front zone. Only the propeller pitch adjustment system 38 is positioned on the second transverse surface 40.2 of the transmission system 36, in the rear zone.

According to a first arrangement visible in FIG. 4, the electric motors 34 positioned in the front zone are offset with respect to the electric motor(s) 34' positioned in the rear zone. According to a second arrangement, the propulsion assembly 30 comprises an electric motor located in the rear zone, which has an output shaft 34.1 aligned with the output shaft 34.1 of an electric motor 34 located in the front zone. This arrangement makes it possible to simplify the architecture of the transmission system 36, by sharing certain elements of the transmission system 36 with the two electric motors located opposite each other, on either side of the transmission system 36.

In either case, the propeller pitch adjustment system 38 is not surrounded by electric motors, which results in improved accessibility.

The propulsion assembly 30 comprises a connection structure 44 positioned in the front zone and interposed between the propeller 32 and the transmission system 36. In one configuration, the electric propulsion assembly comprises a guide system 46 interposed between the connection structure 44 and the output shaft 42 of the transmission system 36 connected to the propeller 20.

The connection structure 44 and the output shaft 42 of the transmission system 36 each have a length (dimension measured parallel to the longitudinal direction) such that no electric motor 34 positioned in the front zone interferes with the propeller 32.

In one embodiment, the connection structure 44 is hollow and comprises a tube 48 extending between first and second ends 48.1, 48.2, the first end 48.1 of the tube 48 being connected by fastening elements to the housing 40 of the transmission system 36. According to one configuration, the connection structure 44 comprises first and second flanges 50.1, 50.2 at the first and second ends of the tube 48, the first flange making it possible to connect the tube 48 to the transmission system 36. Of course, the invention is not limited to this embodiment for connection structure 44.

According to one embodiment, the guide system 46 comprises two bearings 52, 52' interposed between the tube 48 of the connection structure 44 and the output shaft 42 of the transmission system 36 connected to the propeller 20, positioned close to each of the ends 48.1, 48.2 of the tube 48. Of course, the invention is not limited to this embodiment for the guide system 46.

The propulsion assembly 30 comprises at least one attachment structure 54 configured to connect the propulsion assembly 30 to an aircraft support structure, such as a wing structure for example.

The attachment structure 54 comprises at least one first attachment point 56 positioned in a first plane P1 and at least one second attachment point 58 positioned in a second plane P2 offset in the longitudinal direction with respect to the first plane P1, the first and second attachment points 56, 58 being positioned on the transmission system 36 and/or the connection structure 44. For greater stability and better load transfer, the first and second planes P1, P2 are as far apart as possible.

Figure 12:
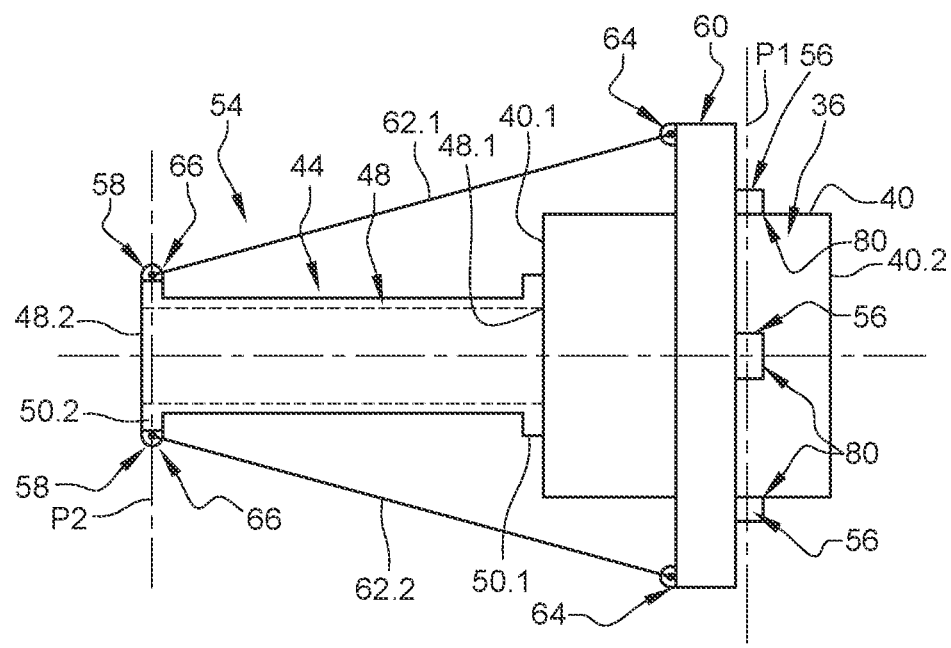
FIG. 12 is a schematic side view of part of an electric propulsion assembly and its attachment structure illustrating another embodiment of the invention.

According to a configuration shown in FIG. 12, the first plane P1 is positioned in line with the transmission system 36. The second plane P2 is positioned in line with the connection structure 44, in particular in line with the second end of the tube 48.

Figure 6:
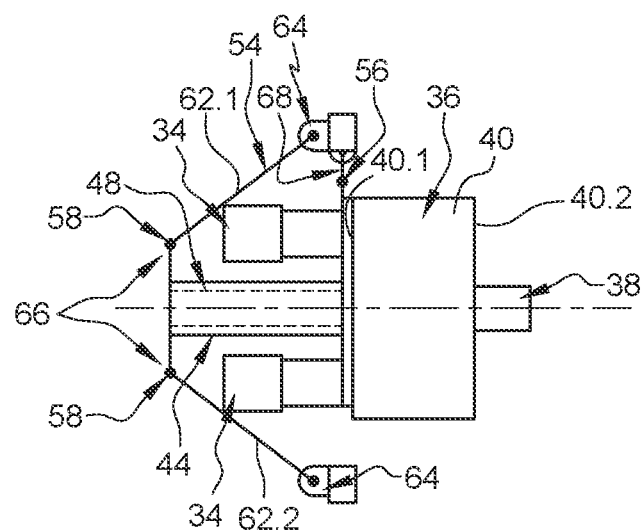
FIG. 6 is a schematic side view of part of an electric propulsion assembly and its attachment structure illustrating an embodiment of the invention.
Figure 7:
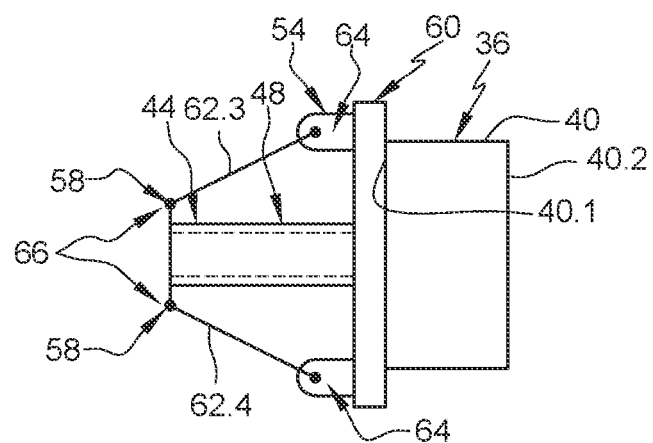
FIG. 7 is a schematic top view of the part of the electric propulsion assembly shown in FIG. 6.

According to a configuration shown in FIGS. 5 to 7, the first and second planes P1, P2 are positioned in line with the connection structure 44, the first plane P1 being located in line with the first end 48.1 of the tube 48, the second plane P2 being located in line with the second end 48.2 of the tube 48. In this configuration, the forces generated by the propeller 32 and transmitted to the aircraft support structure do not pass through the transmission system 36, which is a sensitive element with regard to fire risks. In this case, the transmission system 36 and, more specifically, its housing 40, are not structural.

According to one embodiment, the attachment structure 54 comprises a frame 60 positioned in a transverse plane, approximately in line with the first end 48.1 of the tube 48 of the connection structure 44, several oblique connecting rods 62.1 to 62.4 having a first end connected by a first link 64 to the frame 60 and a second end connected by a second link 66 to one of the second attachment points 58 located at the second end 48.2 of the tube 48 of the connection structure 44, as well as at least two transverse connecting rods 68 each connecting the frame 60 to at least one first attachment point 56 located at the first end 48.1 of the tube 48 of the connection structure 44.

In one configuration, the oblique connecting rods 62.1 to 62.4 are evenly distributed around the connection structure 44. According to an arrangement visible in FIGS. 6 and 7, the attachment structure 54 comprises four oblique connecting rods 62.1 to 62.4 located approximately in a vertical plane passing through the axis of rotation A32 and in a horizontal plane passing through the axis of rotation A32.

For each oblique connecting rod 62.1 to 62.4, each of the first and second links 64, 66 comprises a joint having a pivot axis A64, A66 positioned in a transverse plane and substantially perpendicular to the orientation of the corresponding oblique connecting rod 62.1 to 62.4 (the orientation corresponding to the direction passing through the first and second ends of the corresponding oblique connecting rod). According to an embodiment shown in FIGS. 8 and 10, for each second link 66, the connection structure 44 comprises a clevis attached to the outer surface of the tube 48, with two flanks between which the second end of the oblique connecting rod 62.1 to 62.4 is positioned. In addition, for each first link 64, the frame 60 comprises a clevis having two flanks between which the first end of the oblique connecting rod 62.1 to 62.4 is positioned.

Figure 8:
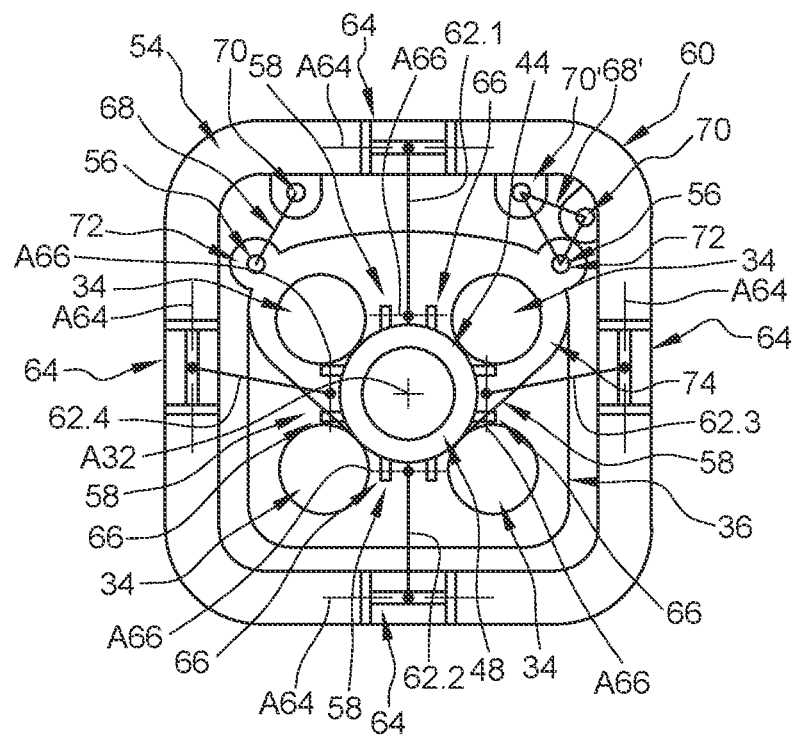
FIG. 8 is a schematic front view of the part of the electric propulsion assembly shown in FIG. 6.
Figure 9:
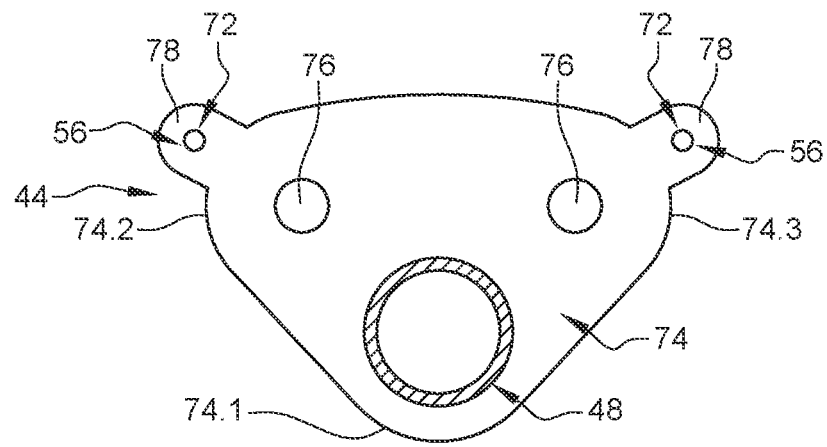
FIG. 9 is a front view of a board of a connection structure illustrating an embodiment of the invention.

According to a configuration shown in FIG. 8, the attachment structure 54 comprises two transverse connecting rods 68, 68' positioned on either side of a vertical plane passing through the axis of rotation A32 and, for each transverse connecting rod 68, 68', at least one first joint 70 connecting the transverse connecting rod 68, 68' and the frame 60, at least one second joint 72 connecting the transverse connecting rod 68, 68' and the connection structure 44.

Each of the first and second joints 70, 72 has a pivot axis substantially parallel to the axis of rotation A32.

According to an embodiment, the connection structure 44 comprises a plate 74, positioned at the first end 48.1 of the tube 48 (in place of or juxtaposed to the first flange 50.1), which plate has, in a transverse plane, an approximately triangular shape with rounded vertices, the tube 48 being positioned close to a first vertex 74.1, the second and third vertices 74.2, 74.3 being connected by an opposite side to the substantially horizontal first vertex 74.1, located above the tube 48 and close to the frame 60, the transverse connecting rods 68, 68' being connected to the plate 74 at the second and third rounded vertices 74.2, 74.3. This plate 74 has at least one through-hole 76 for the output shaft 34.1 of each electric motor 34 positioned at the front of the transmission system 36.

According to a configuration, the attachment structure 54 comprises a first transverse connecting rod 68 connected to the frame 60 by a single first joint 70 and to the connection structure 44 by a single second joint 72, and a second transverse connecting rod 68' connected to the frame 60 by two first joints 70, 70' and to the connection structure 44 by a single joint 72. According to this configuration, the plate 74 comprises first and second extensions 78, at each of the second and third vertices 74.2, 74.3, a first extension for the second joint 72 of the first transverse connecting rod 68, and another for the second joint 72 of the second transverse connecting rod 68'.

Alternatively, the second transverse connecting rod 68' could be connected to the frame 60 by a single first joint 70 and to the connection structure 44 by two second joints 72.

Figure 10:
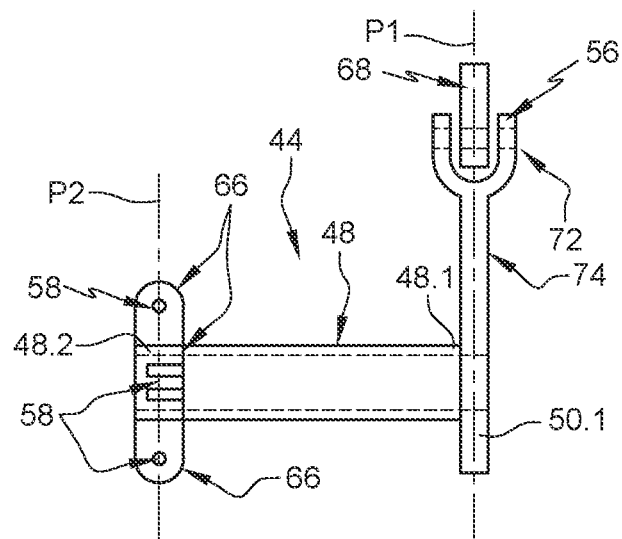
FIG. 10 is a side view of a connection structure illustrating a first embodiment of the invention.
Figure 11:
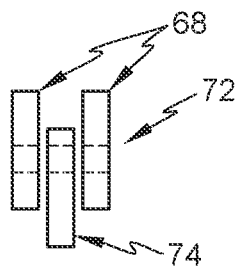
FIG. 11 is a side view of part of a connection structure illustrating a second embodiment.

According to an embodiment shown in FIG. 10, at least one of the second joints 72 comprises a clevis attached to the connection structure 44, which has two flanks between which a transverse connecting rod 68, 68' is positioned. In a further embodiment shown in FIG. 11, at least one of the second joints 72 comprises a fork attached to the corresponding transverse connecting rod 68, 68', which has two flanks between which the plate 74 is positioned. Alternatively, at least one transverse connecting rod 68, 68' comprises two parallel, closely spaced plates arranged on either side of the plate 74.

Of course, the invention is not limited to this embodiment for the attachment structure 54. For example, as shown in FIG. 12, the transverse connecting rods 68, 68' connecting the frame 60 and the housing 40 can be replaced by deformable connection elements 80 of the "silent block" type, for example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion assembly comprising:
    a propeller having an axis of rotation,
    a plurality of electric motors,
    a transmission system configured to couple the electric motors to the propeller and comprising an output shaft connected to the propeller and a propeller pitch adjustment system, the transmission system delimiting a front zone in which the propeller is positioned and a rear zone opposite the front zone, the propeller pitch adjustment system being positioned in the rear zone, wherein at least one of the electric motors is positioned in the front zone, and
    a connection structure interposed between the propeller and the transmission system, the connection structure and the output shaft of the transmission system connected to the propeller in such a way that no electric motor positioned in the front zone interferes with the propeller,
    wherein the connection structure comprises a tube extending between first and second ends, the first end being connected to the transmission system, and further comprising:
    at least one attachment structure configured to connect the propulsion assembly to a support structure of an aircraft, comprising at least one first attachment point positioned in a first plane and at least one second attachment point positioned in a second plane offset from the first plane in a direction parallel to the axis of rotation, the first and second attachment points being positioned on the transmission system or the connection structure or both,
    wherein the first and second planes are positioned in line with the connection structure, the first plane being located in line with the first end of the tube, the second plane being located in line with the second end of the tube.

2. The aircraft propulsion assembly as claimed in claim 1, further comprising:
    a guide system interposed between the connection structure and the output shaft of the transmission system connected to the propeller.

3. The aircraft propulsion assembly as claimed in claim 1, wherein the connection structure comprises a tube extending between first and second ends, the first end being connected to the transmission system.

4. An aircraft comprising the aircraft propulsion assembly as claimed in claim 1.

5. The aircraft propulsion assembly as claimed in claim 1, wherein the at least one attachment structure comprises a frame positioned in a transverse plane, a plurality of oblique connecting rods having a first end connected by a first link to the frame and a second end connected by a second link to one of the second attachment points located at the second end of the tube of the connection structure, and at least two transverse connecting rods each connecting the frame to at least one first attachment point located at the first end of the tube of the connection structure.

6. The aircraft propulsion assembly as claimed in claim 5, wherein each oblique connecting rod has an orientation, and in that, for each oblique connecting rod, each of the first and second links comprises a joint having a pivot axis positioned in the transverse plane and substantially perpendicular to the orientation of the corresponding oblique connecting rod.

7. The aircraft propulsion assembly as claimed in claim 5, wherein the at least one attachment structure comprises:
    two transverse connecting rods positioned on either side of a vertical plane passing through the axis of rotation;
    for each transverse connecting rod a first joint connecting the transverse connecting rod and the frame, and a second joint connecting the transverse connecting rod and the connection structure; and,
    each of the first and second joints having a pivot axis substantially parallel to the axis of rotation.

8. The aircraft propulsion assembly as claimed in claim 5, wherein the connection structure comprises a plate, positioned at the first end of the tube, the plate comprising, in the transverse plane, a triangular shape with first, second and third rounded vertices, the tube being positioned close to the first vertex, the second and third vertices being connected by a side opposite the first substantially horizontal vertex, located above the tube and close to the frame, the transverse connecting rods being connected to the plate at the second and third rounded vertices.

* * * * *